United States Patent Office 3,165,523
Patented Jan. 12, 1965

3,165,523
N-BENZOYL PIPERAZINE DERIVATIVES AND PROCESS FOR THEIR PRODUCTION
Laszlo Vargha, Lajos Toldy, Istvan Toth, Boris Dumbovich, and Jozsef Borsi, all of Budapest, Hungary, assignors to Egyesült Gyógyszer-és Tápszergyár, Budapest, Hungary, a firm
No Drawing. Filed May 3, 1963, Ser. No. 277,726
3 Claims. (Cl. 260—268)

The invention relates to new and valuable piperazine derivatives and to a new procedure of producing such derivatives.

It has been found that the new asymmetrically substituted piperazine derivatives of the Formula I

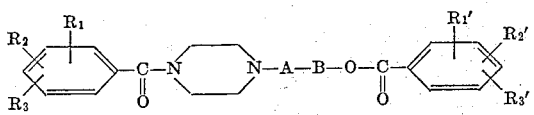

wherein $R_1$, $R_2$, $R_3$ and $R_1'$, $R_2'$, $R_3'$ are lower alkoxy radicals and one of each three substituents may be also a hydrogen atom, A represents a straight or branched alkylene chain containing 1 to 6 carbon atoms and B represents a direct chemical bond or an —OA'— group, wherein A' is a straight or branched alkylene chain of 1 to 6 carbon atoms, as well as the acid addition salts and the quaternary ammonium derivatives thereof have valuable pharmacodynamic properties. These compounds exert a depressant action onto the nervous system. They inhibit on mice the hypermotility originating from the orientation reflex, enhance the narcotic effect of hexobarbital, inhibit to a certain extent the spasms caused by electric current and the exciting effect of different stimulating drugs (as benzpropamine, nicotine, pentamethylene tetrazol, etc.); at the same time they show on cats only very slight vegetative (hypotensive, adrenolytic, non-adrenolytic, parasympatholytic) effects. These compounds show the important advantage that their toxicity is low and they are readily soluble in water; the latter property permits also their parenteral administration in therapy. The average effective dose ($ED_{50}$) of the 3',4',5'-trimethoxy benzoic acid ester of N-3,4,5-trimethoxybenzoyl-N'-β-oxyethyl-piperazine in inhibiting or orientation hypermotility on mice in the case of intraperitoneal administration is 120 mg./kg., on rats 150 mg./kg.; the 3',4',5'-trimethoxybenzoic acid ester of N-3,4,5-trimethoxybenzoyl-N'-β-oxypropyl-piperazine shows analogous $ED_{50}$ values on mice of 56 mg./kg. and on rats 50 mg./kg. The $LD_{50}$ values of these two compounds are i.p. between 400 and 500 mg./kg., in the case of oral administration 1200–1500 mg./kg. The other compounds of Formula I show analogous $ED_{50}$ and $LD_{50}$ values.

The new compounds of the Formula I may be prepared in one of the following ways:

(a) By reacting a piperazine derivative of the Formula II

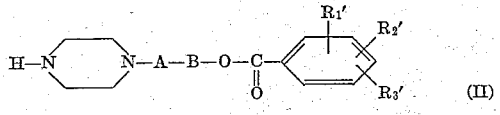

wherein $R_1'$, $R_2'$, $R_3'$, A and B have the same meaning as above, with a reactive derivative, e.g. a halogenide or ester of an alkoxy substituted benzoic acid of the Formula III

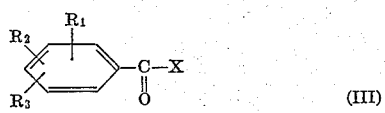

wherein $R_1$, $R_2$ and $R_3$ have the same meaning as above and X represents a reactive residue, preferably a halogene atom; or (b) By reacting a piperazine derivative of the Formula IV

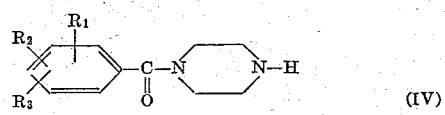

wherein $R_1$, $R_2$ and $R_3$ have the same meaning as above, with a compound of the Formula V

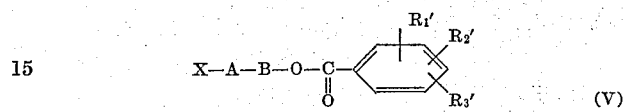

where $R_1'$, $R_2'$, $R_3'$, A, B and X have the same meaning as above; or (c) By esterifying a piperazine derivative of the Formula VI

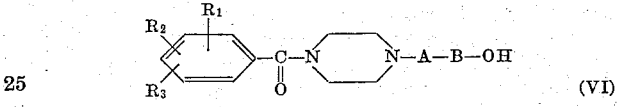

wherein $R_1$, $R_2$, $R_3$, A and B have the same meaning as above, with a compound of the Formula VII

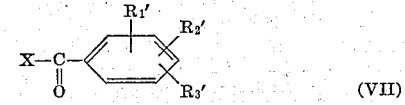

wherein $R_1'$, $R_2'$, $R_3'$ and X have the same meaning as above.

The new compounds of the Formula I may be used therapeutically in the form of free bases or of non toxic avid addition salts (e.g. hydrochlorides, sulphates, phosphates, ethanosulphonates, fumarates, maleates, succinates, tartarates, ascorbinates, etc.) or quaternary derivatives. Said acid addition salts and quaternary derivatives may be prepared by methods known to those skilled in the art.

The invention is illustrated in more details by the following examples.

Example 1

4-(β-hydroxyethyl)-piperazine (20 g.) is dissolved in 200 ml. anhydrous chloroform, triethylamine (34 g.) is added to the solution and a solution of 3,4,5-trimethoxybenzoyl chloride (76 g.) in anhydrous chloroform (450 ml.) is dropped to the stirred and cooled mixture. The reaction mixture is allowed to stand over night, then it is washed with sodium hydrocarbonate solution and with water. The chloroform is distilled off, the residue washed with water and dissolved again in chloroform. The chloroform is evaporated, the residue dissolved in acetone and anhydrous ethanolic hydrochloric acid solution is added. The 1-(3',4',5'-trimethoxybenzoyl)-4-[β-(3'',4'', 5'' - trimethoxy - benzoyloxy) - ethyl] - piperazine hydrochloride precipitates from the solution. The product melts after recrystallization from acetone at 189–191° C.

Example 2

The procedure according to Example 1 is repeated, but instead of 3,4,5-trimethoxybenzoyl chloride an equivalent amount of 3,4-dimethoxybenzyl chloride is used as starting material. The 1-(3',4'-trimethoxybenzoyl)-4-[β-(3'',4'' - dimethovy - benzoyloxy) - ethyl] - piperazine hydrochloride obtained in this way melts after recrystallization from a mixture of anhydrous ethanol and ether at 109–112° C.

Example 3

The procedure according to Example 1 is repeated, but instead of 4-(β-hydroxyethyl)-piperazine an equivalent amount of 4-(β-hydroxypropyl)-piperazine is used as starting material. The 1-(3',4',5'-trimethoxybenzoyl)-4-[β - (3'',4'',5'' - trimethoxybenzoyloxy) - propyl] - piperazine hydrochloride obtained in this way melts after recrystallization from anhydrous ethanol at 173–175° C.

Example 4

The procedure according to Example 1 is repeated, but instead of 4-(β-hydroxyethyl)-piperazine an equivalent amount of 4-(β-hydroxypropyl)-piperazine is used as starting material. The 1-(3',4',5'-trimethoxybenzoyl)-4 - [β - (3'',4'',5'' - trimethoxybenzoyloxy) - propyl] - piperazine hydrochloride obtained in this way melts after recrystallization from anhydrous ethanol at 186–188° C.

Example 5

Metallic sodium (0.8 g.) is dissolved in ethylene glycol (25 g.) and to this solution is added a solution of 1-(3',4',5' - trimethoxybenzoyl) - 4 - (2'' - chloroethyl) - piperazine in anhydrous benzene (50 ml.). The mixture is heated while stirring and the benzene is distilled off within two hours. The residue is stirred at room temperature for further 16 hours, then water and benzene are added, the mixture is shaken, the benezene phase is separated and shaken with a 10% aqueous hydrochloric acid solution (30 ml.). The aqueous acid extract is made alkaline by adding of potassium carbonate and extracted with chloroform. The chloroform extract is evaporated to dryness the residue dissolved in anhydrous ether and then anhydrous ethanolic hydrochloric acid is added to the solution. The precipitated 1-(3',4',5'-trimethoxybenzoyl) - 4 - [2'' - (β - hydrovy-ethoxy) - ethyl] - piperazine hydrochloride melts after recrystallization from anhydrous ethanol at 196–197° C.

1 - (3',4',5' - trimethoxybenzoyl) - 4 - [2'' - (β - hydroxy-ethoxy)-ethyl]-piperazine hydrochloride (2.2 g.) is dissolved in anhydrous chloroform (30 ml.) and 3,4,5-trimethoxybenzoyl chloride (1.4 g.) is added to the solution. The solution is refluxed for 6 hours, cooled and washed with an aqueous solution of sodium hydrocarbonate. The chloroform is then distilled off, the residue dissolved in anhydrous ether and anhydrous ethanolic hydrochloric acid is added to the solution. The 1-(3',4', 5' - trimethoxybenzoyl) - 4 - [2'' - (β-hydroxy-ethoxy)-ethyl]-piperazine 3''',4''',5'''-trimethoxybenzoic acid ester hydrochloride melts after recrystallization from anhydrous ethanol at 158–160° F.

Example 6

N-[2-(β-hydroxy-ethoxy)-ethyl]-piperazine (1.7 g.) and triethylamine (3 ml.) are dissolved in anhydrous chloroform (50 ml.) and 3,4,5-trimethoxybenzoyl chloride (4.7 g.) is added to the cooled solution. The mixture is refluxed for 6 hours, cooled and shaken with an aqueous solution of sodium hydrocarbonate. The separated chloroform solution is evaporated, the residue dissolved in anhydrous ether and anhydrous ethanolic hydrochloric acid is added to the solution. The precipitated 1 - (3',4',5' - trimethoxybenzoyl) - 4 - [2'' - (β-hydroxy - ethoxy) - ethyl] - piperazine 3''',4''',5''' - trimethoxybenzoic acid ester hydrochloride melts after recrystallization from anhydrous ethanol at 158–160° C.

What we claim is:

1. A piperazine derivative of the formula

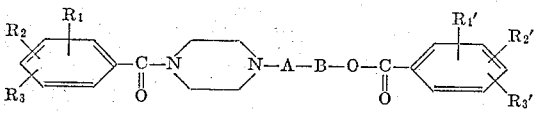

wherein $R_1$, $R_2$, $R_1'$, $R_2'$ are lower alkoxy, $R_3$ and $R_3'$ are members selected from the group consisting of hydrogen and lower alkoxy, A is a bivalent saturated aliphatic hydrocarbon of from 1 to 6 carbon atoms and B is a member selected from the group consisting of a direct chemical bond and an —OA'— group, wherein A' is a bivalent saturated aliphatic hydrocarbon of from 1 to 6 carbon atoms.

2. A piperazine derivative as claimed in claim 1, wherein $R_1$, $R_2$, $R_3$, $R_1'$, $R_2'$ and $R_3'$ are methoxy.

3. 1 - (3',4',5' - trimethoxybenzoyl) - 4 - [β - (3'',4'', 5''-trimethoxy-benzoyloxy)-ethyl]-piperazine.

References Cited in the file of this patent

FOREIGN PATENTS 557,030  Belgium _____ Oct. 28, 1957